(12) United States Patent
Mao

(10) Patent No.: US 11,197,021 B2
(45) Date of Patent: Dec. 7, 2021

(54) CODING RESOLUTION CONTROL METHOD AND TERMINAL

(71) Applicant: Tencent Technology (Shenzhen) Company Limited, Shenzhen (CN)

(72) Inventor: Xunan Mao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/546,045

(22) Filed: Aug. 20, 2019

(65) Prior Publication Data

US 2019/0373284 A1 Dec. 5, 2019

Related U.S. Application Data

(63) Continuation of application No. PCT/CN2018/091199, filed on Jun. 14, 2018.

(30) Foreign Application Priority Data

Jun. 28, 2017 (CN) .......................... 201710510195.8

(51) Int. Cl.
*H04N 7/12* (2006.01)
*H04N 19/59* (2014.01)
(Continued)

(52) U.S. Cl.
CPC ........... *H04N 19/59* (2014.11); *H04N 19/124* (2014.11); *H04N 19/159* (2014.11); *H04N 19/172* (2014.11); *H04N 19/176* (2014.11)

(58) Field of Classification Search
CPC .... H04N 19/59; H04N 19/176; H04N 19/172; H04N 19/159; H04N 19/124; H04N 19/157
See application file for complete search history.

(56) References Cited

U.S. PATENT DOCUMENTS

| 8,780,986 B2 * | 7/2014 | Wu | H04N 19/61 |
| | | | 375/240.13 |
| 2007/0160140 A1 * | 7/2007 | Fujisawa | H04N 19/44 |
| | | | 375/240.12 |

(Continued)

FOREIGN PATENT DOCUMENTS

| CN | 102301710 A | 12/2011 |
| CN | 102461169 A | 5/2012 |

(Continued)

OTHER PUBLICATIONS

Tencent Technology, ISRWO, PCT/CN2018/091199, Aug. 28, 2018, 6 pgs.

(Continued)

*Primary Examiner* — Richard T Torrente
(74) *Attorney, Agent, or Firm* — Morgan, Lewis & Bockius LLP

(57) ABSTRACT

This application relates to an encoding resolution control method and apparatus, and relates to the field of computer technologies. The encoding resolution control apparatus determines a quantization parameter threshold of a current frame according to a preset rule; determines a quantization parameter estimated value of the current frame according to an encoding mode of an encoder; determines encoding resolution of the current frame according to the quantization parameter threshold and the quantization parameter estimated value of the current frame; and encodes the current frame into a bitstream according to the encoding resolution.

16 Claims, 9 Drawing Sheets

(51) Int. Cl.
*H04N 19/124* (2014.01)
*H04N 19/159* (2014.01)
*H04N 19/172* (2014.01)
*H04N 19/176* (2014.01)

(56) References Cited

U.S. PATENT DOCUMENTS

| | | | |
|---|---|---|---|
| 2009/0279603 A1* | 11/2009 | Chen | H04N 19/103 375/240.02 |
| 2012/0076202 A1* | 3/2012 | Brailovskiy | H04N 19/61 375/240.03 |
| 2012/0195372 A1 | 8/2012 | Zhai et al. | |
| 2015/0319437 A1* | 11/2015 | Zhang | H04N 19/172 375/240.03 |
| 2017/0085872 A1 | 3/2017 | Perron et al. | |
| 2017/0208328 A1* | 7/2017 | Kuusela | H04N 19/59 |

FOREIGN PATENT DOCUMENTS

| | | |
|---|---|---|
| CN | 102625104 A | 8/2012 |
| CN | 102883157 A | 1/2013 |
| CN | 103458241 A | 12/2013 |
| DE | 202016008214 U1 | 4/2017 |
| EP | 1551186 A1 | 7/2005 |
| EP | 2978219 A1 | 1/2016 |
| EP | 3145201 A1 | 3/2017 |
| JP | 2008136037 A | 6/2008 |

OTHER PUBLICATIONS

Tencent Technology, IPRP, PCT/CN2018/091199, Dec. 31, 2019, 5 pgs.

* cited by examiner

| I | I | I | I | I | I | I | I |
|---|---|---|---|---|---|---|---|
| I | I | I | I | I | I | I | I |
| I | I | I | I | I | I | I | I |
| I | I | I | I | I | I | I | I |
| I | I | I | I | I | I | I | I |
| I | I | I | I | I | I | I | I |
| I | I | I | I | I | I | I | I |
| I | I | I | I | I | I | I | I |

FIG. 1C

| P | P | P | P | P | P | P | P |
|---|---|---|---|---|---|---|---|
| P | P | P | P | P | P | P | P |
| P | P | P | P | P | P | P | P |
| P | P | P | P | P | P | P | P |
| P | P | P | P | P | P | P | P |
| P | P | P | P | P | P | P | P |
| P | P | P | P | P | P | P | P |
| P | P | P | P | P | P | P | P |

FIG. 1D

| P | I | I | I | I | I | I | I |
|---|---|---|---|---|---|---|---|
| I | P | I | I | I | I | I | I |
| I | I | P | I | I | I | I | I |
| I | I | I | P | I | I | I | I |
| I | I | I | I | P | I | I | I |
| I | I | I | I | I | P | I | I |
| I | I | I | I | I | I | P | I |
| I | I | I | I | I | I | I | P | ly at least 20 MB/second, and it is very difficult for a computer to store and process the video stream. Therefore, the data bandwidth of the video stream needs to be reduced by using a compression coding technology, to store and process the video stream. The video stream is usually encoded by a video encoder, and in working parameters of the video encoder, resolution has great influence on quality of video encoding.
CODING RESOLUTION CONTROL METHOD AND TERMINAL

CROSS-REFERENCE TO RELATED APPLICATIONS

This application is a continuation application of PCT/CN2018/091199, entitled "ENCODING RESOLUTION CONTROL METHOD AND APPARATUS" filed on Jun. 14, 2018, which claims priority to Chinese Patent Application No. 201710510195.8, filed with the Chinese Patent Office on Jun. 28, 2017, and entitled "ENCODING RESOLUTION CONTROL METHOD AND TERMINAL", both of which are incorporated herein by reference in their entirety.

FIELD OF THE TECHNOLOGY

This application relates to the field of computer technologies, and in particular, to an encoding resolution control method and apparatus.

BACKGROUND OF THE DISCLOSURE

With development of technologies such as mobile Internet, intelligent terminals, and ultra-high definition display, video services are increasingly connected with people's lives and learning. Data bandwidth of a video stream generated after video signal digitization is very high and is usually at least 20 MB/second, and it is very difficult for a computer to store and process the video stream. Therefore, the data bandwidth of the video stream needs to be reduced by using a compression coding technology, to store and process the video stream. The video stream is usually encoded by a video encoder, and in working parameters of the video encoder, resolution has great influence on quality of video encoding.

SUMMARY

Embodiments of this application provide an encoding resolution control method and apparatus, to adaptively select encoding resolution for each frame in a video stream, so that an encoding manner of each frame is more accurate, thereby improving quality of a video picture, optimizing a visual effect of the video picture, better meeting a user requirement, and improving user experience.

An embodiment of this application provides an encoding resolution control method, applied to a computer device having one or more processors and memory storing programs to be executed by the one or more processors and the method including:
determining a quantization parameter threshold of a to-be-encoded current frame according to a preset rule;
determining a quantization parameter estimated value of the current frame according to an encoding mode of an encoder;
determining encoding resolution of the current frame according to the quantization parameter threshold and the quantization parameter estimated value of the current frame; and
encoding the current frame into a bitstream according to the encoding resolution.

An embodiment of this application provides a computer device comprising one or more processors, memory coupled to the one or more processors and a plurality of programs stored in the memory that, when executed by the one or more processors, cause the computer device to perform a plurality of operations comprising:
determining a quantization parameter threshold of a to-be-encoded current frame according to a preset rule;
determining a quantization parameter estimated value of the current frame according to an encoding mode of an encoder;
determining encoding resolution of the current frame according to the quantization parameter threshold and the quantization parameter estimated value of the current frame; and
encoding the current frame into a bitstream according to the encoding resolution.

An embodiment of this application provides a non-transitory computer-readable storage medium, storing a plurality of machine readable instructions in connection with a computer device having one or more processors, wherein the plurality of machine readable instructions, when executed by the one or more processors, cause the computer device to perform a plurality of operations including:
determining a quantization parameter threshold of a to-be-encoded current frame according to a preset rule;
determining a quantization parameter estimated value of the current frame according to an encoding mode of an encoder;
determining encoding resolution of the current frame according to the quantization parameter threshold and the quantization parameter estimated value of the current frame; and
encoding the current frame into a bitstream according to the encoding resolution.

An embodiment of this application further provides an encoding resolution control method, applied to a computing device, the computing device including a processor and a memory, and the method including:
determining a quantization parameter threshold of a to-be-encoded current frame according to a preset rule;
determining a quantization parameter estimated value of the current frame according to an encoding mode of an encoder;
determining encoding resolution of the current frame according to the quantization parameter threshold and the quantization parameter estimated value of the current frame; and
encoding the current frame into a bitstream according to the encoding resolution.

It should be understood that, the foregoing general descriptions and the following detailed descriptions are merely for illustration and explanation purposes and are not intended to limit this application.

BRIEF DESCRIPTION OF THE DRAWINGS

The accompanying drawings herein are included in the specification and form a part of the specification, show embodiments that conform to this application, and are used to describe the principle of this application together with the specification.

FIG. 1C is an example diagram of an intra-frame prediction frame shown according to an embodiment of this application.

FIG. 1D is an example diagram of an inter-frame prediction frame shown according to an embodiment of this application.

Explicit embodiments of this application have been shown by the foregoing accompanying figures, which are described in more detail below. The accompanying drawings and the text descriptions are not intended to limit the scope of the concept of this application in any manner, and the concept of this application is described for a person skilled in the art by referring to specific embodiments.

DESCRIPTION OF EMBODIMENTS

Exemplary embodiments are described in detail herein, and examples of the exemplary embodiments are shown in the accompanying drawings. When the following descriptions relate to the accompanying drawings, unless indicated otherwise, same numbers in different accompanying drawings represent same or similar elements. The implementations described in the following exemplary embodiments do not represent all implementations consistent with this application.

Embodiments of this application provide an encoding resolution control method and apparatus. The encoding resolution control apparatus may be assembled in a computing device including a memory and a processor. The computing device may perform the encoding resolution control method. According to the encoding resolution control method, a quantization parameter threshold of a to-be-encoded current frame is first determined according to a preset rule; a quantization parameter estimated value of the current frame is determined according to an encoding mode of an encoder, to determine encoding resolution of the current frame according to the quantization parameter threshold and the quantization parameter estimated value of the current frame; and then the current frame is encoded according to the determined encoding resolution. Therefore, a quantization parameter threshold is set for each frame in a video stream, and then encoding resolution of the frame is determined according to the quantization parameter threshold and a quantization parameter estimated value, to adaptively select the encoding resolution for each frame in the video stream, so that an encoding manner of each frame is more accurate, thereby improving quality of a video picture, optimizing a visual effect of the video picture, better meeting a user requirement, and improving user experience.

An encoding resolution control method and a terminal provided in this application are described in detail below with reference to the accompanying drawings.

Figure 1A:
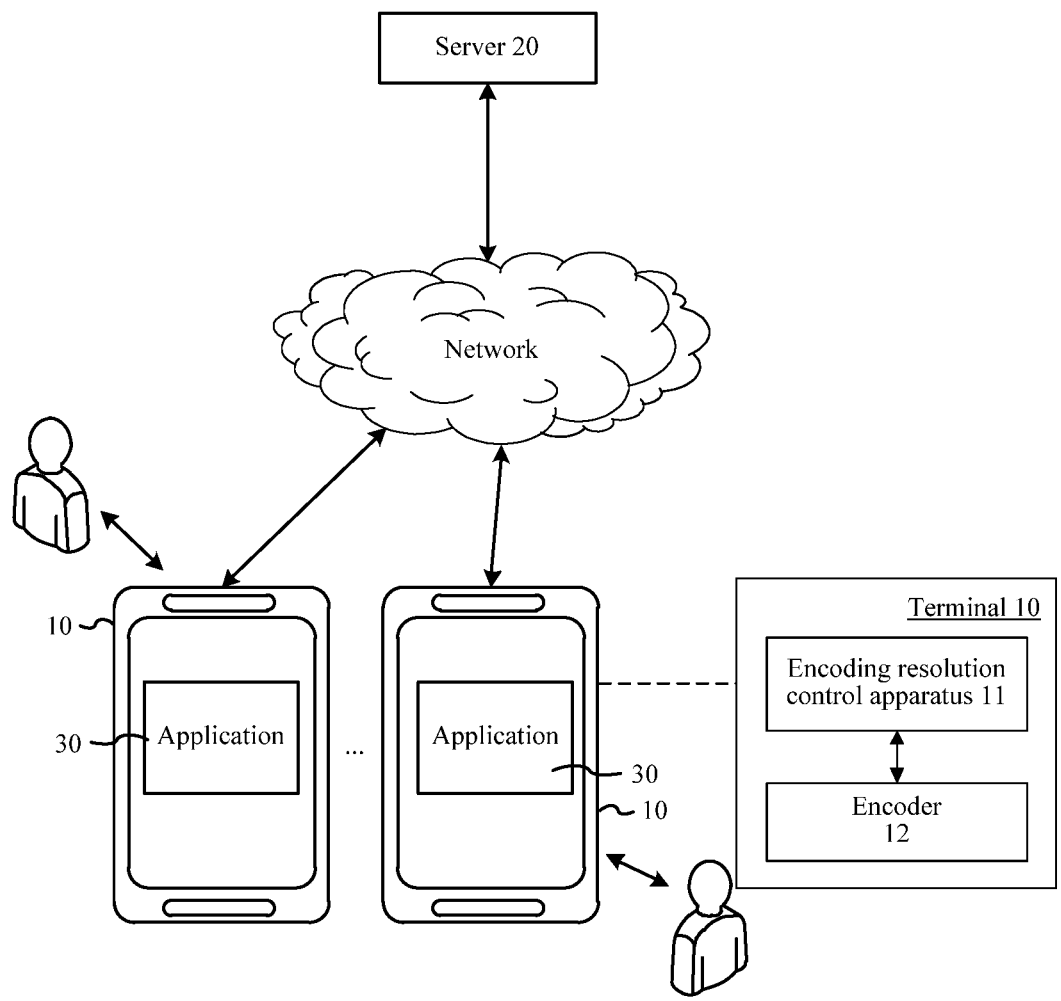
FIG. 1A is a schematic diagram of an application environment of an encoding resolution control apparatus shown according to an embodiment of this application.

FIG. 1A is a schematic diagram of an application environment of an encoding resolution control apparatus shown according to an embodiment of this application. The application environment includes a terminal 10 and a server 20. A user of the terminal 10 may make a real-time video call with another user by using an instant messaging application 30 on the terminal 10. The server 20 is an instant messaging server. An encoding resolution control apparatus 11 and an encoder 12 are disposed in the terminal 10. The encoding resolution control apparatus 11 may perform an encoding resolution control method, and is configured to determine resolution for encoding a video stream generated during the video call. The encoding resolution control apparatus 11 transmits the determined resolution to the encoder 12, so that the encoder 12 encodes the video stream. An example in which the encoding resolution control apparatus 11 is disposed in the terminal 10 is used for description, and the encoding resolution control apparatus 11 may be disposed in the server or in another scenario in which the video stream needs to be encoded.

Figure 1B:
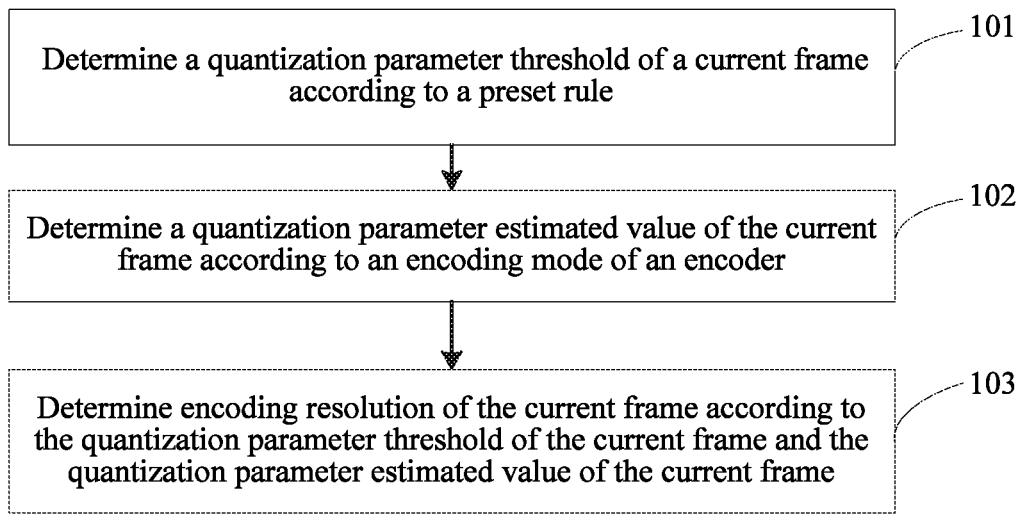
FIG. 1B is a schematic flowchart of an encoding resolution control method shown according to an embodiment of this application.

FIG. 1B is a schematic flowchart of encoding resolution control method shown according to an exemplary embodiment.

As shown in FIG. 1B, the encoding resolution control method includes the following steps:

Step 101: Determine a quantization parameter threshold of a to-be-encoded current frame according to a preset rule.

The encoding resolution control method provided in this embodiment of this application may be performed by a computing device. The computing device may be a terminal, to control encoding resolution when performing video compression coding. There are various types of terminals, for example, the terminal may be a mobile phone or a computer.

An encoder may classify frames in a video stream into a P frame and an I frame when encoding the video stream. A frame type may be preset. For example, it is set in such a manner that there is an I frame at an interval of 30 frames in the video stream and other frames are P frames. The I frame is also referred to as an intra frame, the I frame usually reserves a complete picture of a current frame image, and decoding of the I frame on a decoding end does not depend on information in another frame. The P frame is also referred to as an inter-frame prediction encoded frame, the P frame indicates a difference between the current frame and one or more I frames (or P frames) (reference frames) in front, and decoding of the P frame needs to depend on information in one or more reference frames in front of the P frame. Usually, a first frame in the video stream is an I frame. To reduce data bandwidth of a video, there is usually a plurality of consecutive P frames behind the I frame. When a picture scene of the video greatly changes, in the plurality of consecutive P frames, there may be an I frame.

When encoding the video stream, the encoder divides an encoded frame into blocks of fixed sizes. Encoding is performed in blocks, which, for example, includes: performing motion estimation and motion compensation in blocks, to remove temporal redundancy from a video sequence;

removing spatial redundancy from the video sequence through intra-frame prediction; transforming residual data after the motion estimation or the motion compensation or residual data after the intra-frame prediction in the frame (energy is concentrated on a few coefficients in a transform domain); quantizing residual data obtained through transform coding; and encoding a motion vector and the changed and quantized residual data.

A transform process is performed through, for example, Discrete Cosine Transform (DCT). DCT is a spatial transformation method, which is performed in blocks, and a DCT coefficient data block is generated. Quantization is performed, for example, for a DCT transformation coefficient, and a quantization process is to remove the DCT transformation coefficient by using a quantization step, and 64 DCT transformation coefficients in a DCT transform block use different quantization precision, to ensure that as much specific DCT space frequency information as possible is included, and the quantization precision does not exceed a requirement. Usually, a low frequency coefficient is of great importance to visual induction in the DCT transformation coefficient, so the quantization precision of the distribution is finer; and a high frequency coefficient is less important to the visual induction, and the quantization precision of the distribution is coarser.

There are a total of 52 values for the quantization step that fall within a range from 0.625 to 224 and increase at a proportion of 12.5%. The quantization parameter is a sequence number of the quantization step and has a value of 0 to 51. When the quantization parameter is a minimum value 0, it indicates that quantization is finest. On the contrary, when the quantization parameter is a maximum value 51, it indicates that quantization is coarsest. The quantization step increases as the quantization parameter increases. Each time the value of the quantization parameter is increased by 6, the quantization step is doubled. During encoding and transmission, an actual value of the quantization step does not need to be transmitted, and only a number corresponding to the quantization step, namely, the quantization parameter needs to be transmitted.

In this embodiment of this application, the computing device determines the quantization parameter threshold of the current frame according to the preset rule.

In this embodiment of this application, step 101 may be specifically implemented in the following manner:

Step 101a: Determine an intra-frame prediction block proportion of the current frame according to intra-frame prediction block proportions of N consecutive inter-frame prediction frames in front of the current frame, where N is a positive integer greater than or equal to 1.

Step 101b: Determine the quantization parameter threshold of the current frame according to the intra-frame prediction block proportion of the current frame.

In each frame in the video stream, there may be hundreds of blocks, and each block has a corresponding prediction mode such as intra-frame prediction or inter-frame prediction. The prediction mode may be selected according to the mode, for example, a plurality of prediction modes is attempted, and an optimal prediction mode is selected according to a particular rule. For example, a mode with a smallest encoding penalty is selected.

For the current frame, that a prediction mode corresponding to a block A is intra-frame prediction means that the block A can be predicted according to another block of the current frame; and that a prediction mode corresponding to a block B is inter-frame prediction means that the block B can be predicted according to the current frame and a previous frame of the current frame.

Figures 1E, 1F:
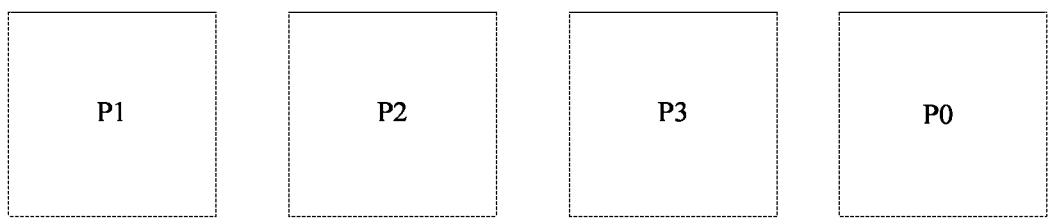
FIG. 1E is an example diagram of another inter-frame prediction frame shown according to an embodiment of this application.
FIG. 1F is an example diagram of a video stream shown according to an embodiment of this application.

FIG. 1C to FIG. 1E each are an example diagram of an intra-frame prediction frame shown according to an embodiment of this application. If I is used to indicate one frame of image in the video stream, a prediction mode corresponding to a block is an intra-frame prediction mode, and P is used to indicate that a prediction mode corresponding to a block uses an inter-frame prediction mode. There are, for example, 8*8=64 data blocks in each frame. For an intra-frame prediction frame, as shown in FIG. 1C, all blocks included in the intra-frame prediction frame all use the intra-frame prediction mode. For an inter-frame prediction frame, as shown in FIG. 1D, blocks included in the inter-frame prediction frame may use only the inter-frame prediction mode; or as shown in FIG. 1E, blocks included in the inter-frame prediction frame may use both the inter-frame prediction mode and the intra-frame prediction mode.

In this embodiment of this application, for the inter-frame prediction frame, prediction modes of the blocks included in the inter-frame prediction frame may be set as required. Correspondingly, inter-frame prediction blocks and intra-frame prediction blocks included in the inter-frame prediction frame may be distributed in a plurality of manners. FIG. 1E only shows one case as an example.

In this embodiment of this application, the intra-frame prediction block proportion is a proportion of intra-frame prediction blocks to all blocks in a P frame. For example, if the current frame is a P frame and includes a total of 64 blocks, eight blocks are intra-frame prediction blocks, and 56 blocks are inter-frame prediction blocks, the intra-frame prediction block proportion of the current frame is: 8/64=1/8=12.5%.

According to an example, the computing device may determine the intra-frame prediction block proportion of the current frame according to an average value of intra-frame prediction block proportions of N consecutive P frames included in front of the current frame.

A value of N may be a predetermined fixed value or may be a value determined as required. This is not limited herein. According to this embodiment of this application, a smaller value of N indicates that a video scene change can be more quickly responded to, but frequent resolution switching may be performed, causing a subjective quality flicker. During actual use, the value of N may be determined in consideration of both a speed of responding to the video scene change and a subjective quality requirement.

For example, N may be preset to 1, and regardless of a quantity of consecutive P frames in front of the current frame, the computing device can determine the intra-frame prediction block proportion of the current frame according to an intra-frame prediction block proportion of one P frame in front of the current frame.

Alternatively, the computing device may determine the value of N according to a quantity of consecutive P frames in front of the current frame. That is, before step 101a, the method may further include:

determining a quantity M of consecutive inter-frame prediction frames in front of the current frame, where M is a non-negative number; and determining, by the computing device, that N=M when M is a value greater than or equal to 1 and less than or equal to 2; otherwise, determining that N=2.

That is, when one P frame is included in front of the current frame, the computing device may determine an intra-frame prediction block proportion of the P frame in front of the current frame as the intra-frame prediction block proportion of the current frame; when two P frames are included in front of the current frame, the computing device may determine an average value of intra-frame prediction block proportions of the two P frames in front of the current frame as the intra-frame prediction block proportion of the current frame; or when at least three P frames are included in front of the current frame, the computing device may determine an average value of intra-frame prediction block proportions of two P frames in front of the current frame as the intra-frame prediction block proportion of the current frame.

For example, FIG. 1F is an example diagram of a video stream shown according to an embodiment of this application. As shown in FIG. 1F, three P frames are included in front of the current frame P0 and are respectively P1, P2, and P3, and intra-frame prediction block proportions $Intra_1$, $Intra_2$, and $Intra_3$ of P1, P2, and P3 are respectively: $Intra_1=10\%$, $Intra_2=20\%$, and $Intra_3=30\%$.

If N is preset to a fixed value of 1, the intra-frame prediction block proportion $Intra_0$ of the current frame P0 is the intra-frame prediction block proportion of P3, that is, $Intra_0=Intra_3=30\%$.

When the computing device determines the value of N according to a quantity of consecutive P frames in front of the current frame P0, because three consecutive P frames are included in front of the current frame P0, it may be determined that N=2, and the intra-frame prediction block proportion $Intra_0$ of the current frame P0 is an average value $Intra_{ave}$ of the intra-frame prediction block proportions of P2 and P3, that is, $Intra_0=Intra_{ave}=(Intra_2+Intra_3)/2=(20\%+30\%)/2=25\%$.

Alternatively, the computing device may determine the intra-frame prediction block proportion of the current frame in another manner according to intra-frame prediction block proportions respectively corresponding to N consecutive P frames in front of the current frame. This is not limited herein.

According to this embodiment of this application, after determining the intra-frame prediction block proportion of the current frame, the computing device determines the quantization parameter threshold of the current frame according to the intra-frame prediction block proportion of the current frame.

During specific implementation, the computing device may determine the quantization parameter threshold of the current frame in the following manner. That is, step 101b may include:

determining, according to a preset correspondence between an intra-frame prediction block proportion and a quantization parameter threshold, a quantization parameter threshold corresponding to the intra-frame prediction block proportion of the current frame.

According to this embodiment of this application, the correspondence between an intra-frame prediction block proportion and a quantization parameter threshold may be preset, so that after determining the intra-frame prediction block proportion of the current frame, the computing device can determine, according to the preset correspondence, the quantization parameter threshold corresponding to the intra-frame prediction block proportion of the current frame.

For example, the correspondence between an intra-frame prediction block proportion Intra and a quantization parameter threshold $QP_{TH}$ may be preset to:

$$QP_{TH} = \begin{cases} 33, & Intra < 10\% \\ 31, & 10\% \le Intra < 50\% \\ 29, & Intra \ge 50\% \end{cases}$$

Therefore, if it is determined that the intra-frame prediction block proportion Intra0 of the current frame is 25%, because 25% is greater than or equal to 10% and less than 50%, it may be determined, according to the preset correspondence, that the quantization parameter threshold $QP_{TH}$ of the current frame is 31; or if it is determined that the intra-frame prediction block proportion Intra0 of the current frame is 5%, because 5% is less than 10%, it may be determined, according to the preset correspondence, that the quantization parameter threshold $QP_{TH}$ of the current frame is 33.

Step 102: Determine a quantization parameter estimated value of the current frame according to an encoding mode of an encoder.

In this embodiment of this application, the determined quantization parameter estimated value of the current frame is a quantization parameter estimated value when it is assumed that the current frame uses full-resolution encoding. The full-resolution encoding is a processing process of performing encoding according to original resolution of an image.

According to this embodiment of this application, the quantization parameter estimated value of the current frame may be determined in the following plurality of manners.

For example, if the computing device determines that the encoding mode of the encoder is encoding with a fixed quantization parameter, it is determined that the quantization parameter estimated value of the current frame is a fixed quantization parameter value corresponding to the current frame. According to this embodiment of this application, the encoding mode with a fixed quantization parameter is that the quantization parameter is preset before the encoder performs encoding, for example, before encoding, it is specified that a quantization parameter of a first frame is 23, a quantization parameter of a second frame is 25, and a quantization parameter of a third frame is 24, and it is determined that the quantization parameter estimated value of the current frame is a preset fixed quantization parameter value of the current frame. If the encoding mode of the encoder is encoding with a fixed quantization parameter, quantization parameters of all blocks in the current frame are known, and the quantization parameter estimated value of the current frame is an actual quantization parameter during full-resolution encoding of the current frame.

For example, if the computing device determines that the encoding mode of the encoder is encoding at a fixed bit rate, the computing device predicts the quantization parameter estimated value of the current frame according to quantization parameters respectively corresponding to L encoded frames in front of the current frame, where L is a value determined according to a currently used bit rate control algorithm. In encoding mode at a fixed bit rate, the encoder flexibly adjusts a quantization parameter according to a preset bit rate.

According to this embodiment of this application, assuming that the current frame is full-resolution encoded, if encoding is performed at a fixed bit rate, the quantization parameter estimated value of the current frame may be set to be equal to a quantization parameter estimated value of a first block of the current frame, and a value of L is determined according to the bit rate control algorithm. Therefore the quantization parameter estimated value of the first block of the current frame may be predicted according to the quantization parameters respectively corresponding to the L encoded frames in front of the current frame, to obtain the quantization parameter estimated value of the current frame.

Step 103: Determine encoding resolution of the current frame according to the quantization parameter threshold of the current frame and the quantization parameter estimated value of the current frame.

According to this embodiment of this application, a correspondence between a quantization parameter threshold of a frame and a quantization parameter estimated value of the frame and encoding resolution of the frame may be preset, to determine the encoding resolution of the current frame according to the preset correspondence after the quantization parameter threshold of the current frame and the quantization parameter estimated value of the current frame are determined.

For example, it may be preset in such a manner that downsampling encoding is performed on a frame when a quantization parameter estimated value of the frame is greater than a quantization parameter threshold of the frame; or full-resolution encoding is performed on a frame when a quantization parameter estimated value of the frame is less than a quantization parameter threshold of the frame. The downsampling encoding is a processing process of transforming a frame with high resolution into a frame with low resolution, to reduce a data amount of processed frame images. In this way, if the quantization parameter estimated value of the current frame is greater than the quantization parameter threshold of the current frame, it may be determined that the current frame is downsampling encoded; or if the quantization parameter estimated value of the current frame is less than or equal to the quantization parameter threshold, it may be determined that the current frame is full-resolution encoded.

For example, if the quantization parameter threshold of the current frame that is determined according to the preset rule is 35, and the quantization parameter estimated value of the current frame that is determined by the computing device according to the encoding at a fixed bit rate that is used by the encoder is 31, because the quantization parameter estimated value of the current frame is less than the quantization parameter threshold, the computing device may determine that full-resolution encoding needs to be performed on the current frame.

According to this embodiment of this application, a higher intra-frame prediction block proportion of the current frame indicates that it is more difficult to affect quality of a video picture by use of downsampling encoding. That is, a higher intra-frame prediction block proportion of the current frame indicates a higher possibility that downsampling encoding may be set for the current frame. In addition, when the quantization parameter estimated value of the current frame may be set to be greater than the quantization parameter threshold, it is determined that the current frame is downsampling encoded. Therefore, in this embodiment of this application, it may be set in such a manner that a higher intra-frame prediction block proportion of the current frame indicates a lower quantization parameter threshold of the current frame, so that the current frame prefers to select the downsampling encoding; otherwise, a smaller intra-frame prediction block proportion of the current frame indicates a larger quantization parameter threshold of the current frame, so that the current frame prefers to select the full-resolution encoding.

According to encoding resolution control method provided in this embodiment of this application, the computing device first determines a quantization parameter threshold of a to-be-encoded current frame according to a preset rule; then determine a quantization parameter estimated value of the current frame according to an encoding mode of an encoder; and finally determine encoding resolution the current frame according to the quantization parameter threshold and the quantization parameter estimated value of the current frame, and provide the determined encoding resolution to the encoder, so that the encoder encodes the current frame according to the determined encoding resolution. Therefore, a quantization parameter threshold is set for each frame in a video stream, and encoding resolution of the frame is determined according to the quantization parameter threshold and a quantization parameter estimated value, to adaptively select encoding resolution for each frame in the video stream, so that an encoding manner of each frame is more accurate, thereby improving quality of a video picture, optimizing a visual effect of the video picture, better meeting a user requirement, and improving user experience.

It can be learned from the foregoing analysis that, the quantization parameter threshold of the to-be-encoded current frame may be determined according to the preset rule, and assuming that the current frame uses the full-resolution encoding, the quantization parameter estimated value of the current frame is determined according to the encoding mode of the encoder, to determine the encoding resolution of the current frame according to the quantization parameter threshold and the quantization parameter estimated value of the current frame. During actual application, during video encoding, a quantization parameter actual value of each frame in a video stream further needs to be determined. The foregoing case is described in detail below with reference to FIG. 2.

Figure 2:
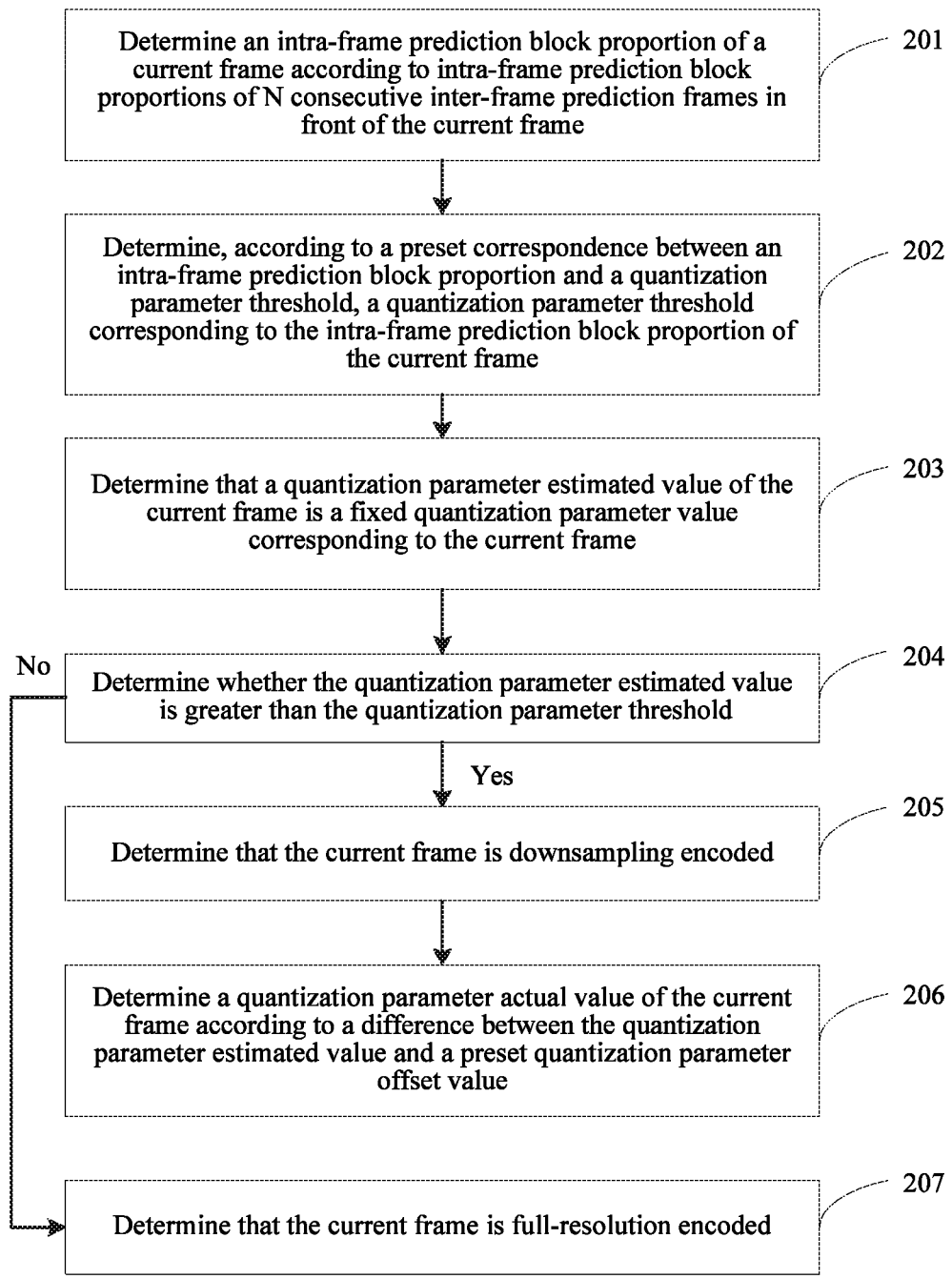
FIG. 2 is a schematic flowchart of an encoding resolution control method shown according to an embodiment of this application.

FIG. 2 is a schematic flowchart of an encoding resolution control method shown according to an embodiment of this application.

As shown in FIG. 2, the encoding resolution control method includes the following steps:

Step 201: Determine an intra-frame prediction block proportion of a current frame according to intra-frame prediction block proportions of N consecutive inter-frame prediction frames in front of the current frame.

Step 202: Determine, according to a preset correspondence between an intra-frame prediction block proportion and a quantization parameter threshold, a quantization parameter threshold corresponding to the intra-frame prediction block proportion of the current frame.

Step 203: Determine that a quantization parameter estimated value of the current frame is a fixed quantization parameter value corresponding to the current frame.

In this embodiment of this application, an encoding mode of an encoder is encoding with a fixed quantization parameter.

Step 204: Determine whether the quantization parameter estimated value is greater than the quantization parameter threshold, and if yes, perform step 205; otherwise, perform step 207.

Step 205: Determine that the current frame is downsampling encoded. That is, the current frame uses downsampling encoded.

Step 206: Determine a quantization parameter actual value of the current frame according to a difference between the quantization parameter estimated value and a preset quantization parameter offset value.

Step 207: Determine that the current frame is full-resolution encoded. That is, the current frame uses full-resolution encoding.

For a specific implementation process and a principle of step 201 to step 207, refer to the detailed descriptions of step 101 to step 103 in the foregoing embodiment, and details are not described herein again.

The steps are performed by, for example, a computing device. After the computing device completes step 205 and step 207, the encoder separately performs downsampling encoding or full-resolution encoding on the current frame.

According to this embodiment of this application, the quantization parameter estimated value of the current frame that is determined according to the encoding mode of the encoder is a quantization parameter estimated value when it is assumed that the current frame uses the full-resolution encoding. Therefore, if it is determined, according to the quantization parameter estimated value and the quantization parameter threshold of the current frame, that the current frame is full-resolution encoded, the quantization parameter estimated value of the current frame that is determined according to the encoding mode of the encoder is the quantization parameter actual value of the current frame.

If it is determined, according to the quantization parameter estimated value and the quantization parameter threshold of the current frame, that the current frame is downsampling encoded, the quantization parameter estimated value further needs to be processed, to determine the quantization parameter actual value of the current frame. According to this embodiment of this application, if the downsampling encoding is used, a quantization parameter offset needs to be set, that is, a quantization parameter is decreased.

According to this embodiment of this application, to cause a downsampling encoded quantization parameter to correspond to a full-resolution encoded quantization parameter, the quantization parameter offset value may be preset, to determine, according to the difference between the quantization parameter estimated value and the preset quantization parameter offset value, the quantization parameter actual value when the current frame is downsampled.

The quantization parameter offset value is used to represent a difference between a full-resolution quantization parameter and a downsampling quantization parameter, and may be set according to experience. The quantization parameter offset value may be set to an integer value greater than or equal to zero, for example, 6 or 7. An information loss exists in a downsampling algorithm, so that a smaller quantization step is used to reduce a further information loss, thereby reducing flickers of image quality when switching between different resolutions.

For example, the quantization parameter offset value $QP_{delta}$ may be preset to be equal to the full-resolution quantization parameter QP'—the downsampling quantization parameter QP, that is, 8. It is assumed that when the current frame is full-resolution encoded, the quantization parameter estimated value QP' of the current frame is 35. If it is determined, according to the quantization parameter threshold and the quantization parameter estimated value of the current frame, that the current frame is downsampling encoded, it may be determined, according to the quantization parameter offset value $QP_{delta}$, that the quantization parameter actual value QP of the current frame is that QP=35−8=27.

According to the encoding resolution control method provided in this embodiment of this application, the computing device first determines a quantization parameter threshold of a to-be-encoded current frame according to a preset rule; then determine a quantization parameter estimated value of a current frame according to an encoding mode of an encoder; and finally determine encoding resolution of the current frame according to the quantization parameter threshold and the quantization parameter estimated value of the current frame. If the computing device determines that the quantization parameter estimated value is greater than the quantization parameter threshold, the computing device determines that current frame is downsampling encoded, to determine a quantization parameter actual value of the current frame according to a difference between the quantization parameter estimated value and a preset quantization parameter offset value. If the computing device determines that the quantization parameter estimated value is less than or equal to the quantization parameter threshold, the computing device determines that the current frame is full-resolution encoded. Therefore, a quantization parameter threshold is set for each frame of a video stream, encoding resolution of the frame is determined according to the quantization parameter threshold and a quantization parameter estimated value, and a quantization parameter actual value is determined according to the quantization parameter estimated value when the current frame is downsampling encoded or full-resolution encoded, to adaptively select encoding resolution for each frame in the video stream, so that an encoding manner of each frame is more accurate, thereby improving quality of a video picture, optimizing a visual effect of the video picture, better meeting a user requirement, and improving user experience.

It can be learned from the foregoing analysis that, an intra-frame prediction block proportion of the current frame may be determined according to intra-frame prediction block proportions of N consecutive inter-frame prediction frames in front of the current frame, to determine the quantization parameter threshold of the current frame, and the quantization parameter estimated value of the current frame is determined according to the encoding mode of the encoder, to determine the encoding resolution of the current frame according to the quantization parameter threshold and the quantization parameter estimated value of the current frame. During actual application, the current frame may be a first frame or there is no inter-frame prediction frame in front of the current frame. The foregoing case is described in detail below with reference to FIG. 3A.

Figure 3A:
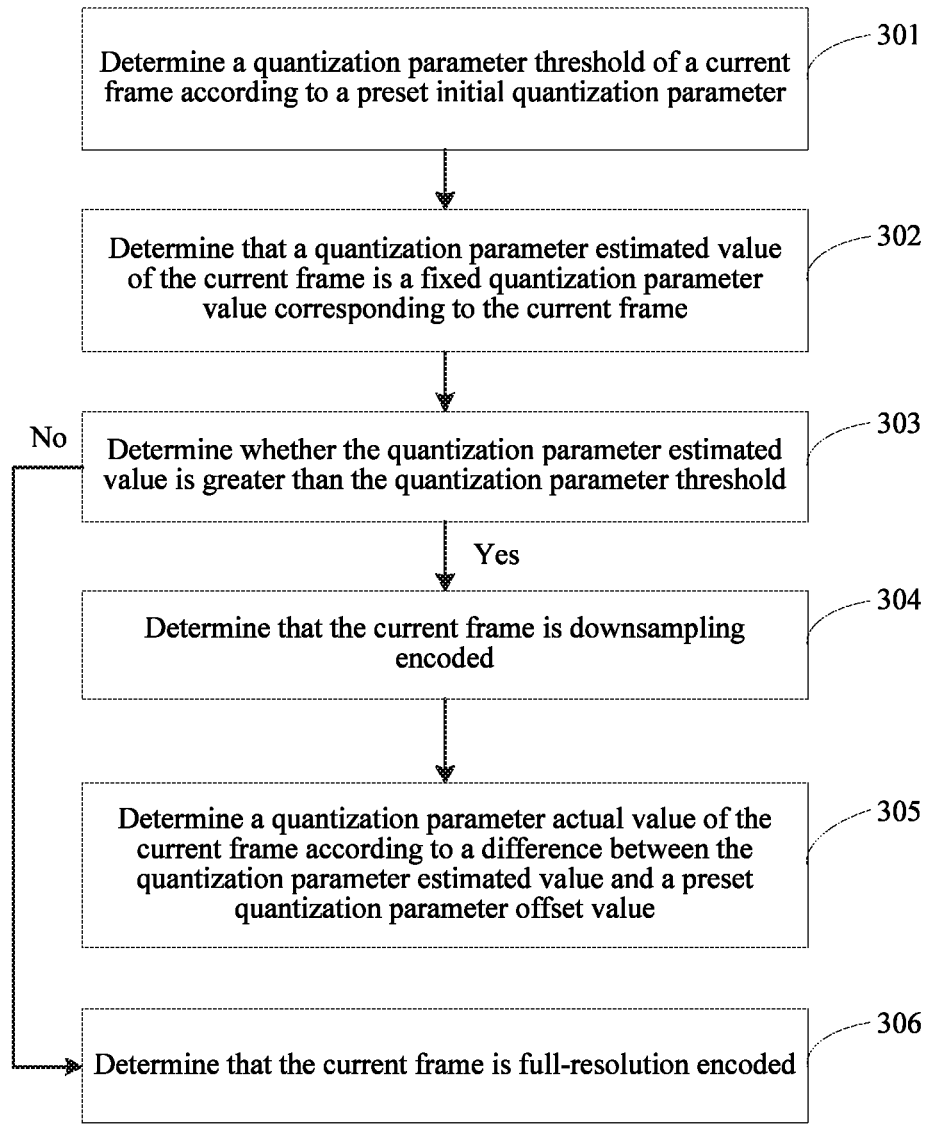
FIG. 3A is a schematic flowchart of an encoding resolution control method shown according to an embodiment of this application.

FIG. 3A is a schematic flowchart of an encoding resolution control method shown according to an embodiment of this application.

As shown in FIG. 3A, the encoding resolution control method may include the following steps:

Step 301: Determine a quantization parameter threshold of a current frame according to a preset initial quantization parameter.

In this embodiment of this application, an initial quantization parameter may be preset. If the current frame is a first frame in a video stream or the current frame is a first P frame, the quantization parameter threshold of the current frame may be determined according to the preset initial quantization parameter.

Figure 3B:
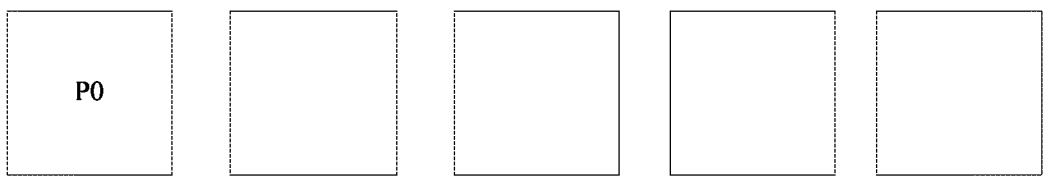
FIG. 3B is an example diagram of a video stream shown according to an embodiment of this application.

For example, the initial quantization parameter may be preset to 30. As shown in FIG. 3B, if a current frame P0 is a first frame in a video stream, a quantization parameter threshold of the current frame may be determined as the initial quantization parameter 30.

Figure 3C:
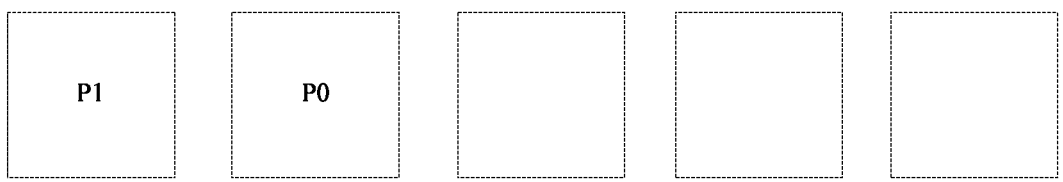
FIG. 3C is an example diagram of a video stream shown according to an embodiment of this application.

As shown in FIG. 3C, if a current frame P0 is a second frame in a video stream and a first frame P1 in the video stream is an I frame, a quantization parameter threshold of the current frame may be determined as the initial quantization parameter 30.

In addition, if the current frame is a P frame and a frame in front of the current frame is an I frame, the quantization parameter threshold of the current frame may be determined according to a quantization parameter threshold corresponding to the frame in front of the current frame.

Figure 3D:
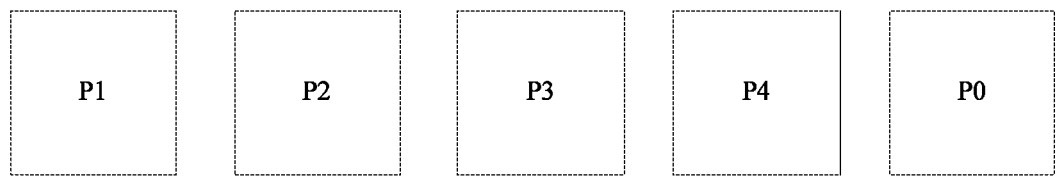
FIG. 3D is an example diagram of a video stream shown according to an embodiment of this application.

For example, as shown in FIG. 3D, if a current frame P0 is a fifth frame in a video stream, a first frame P1 and a fourth frame P4 in the video stream are I frames, and a second frame P2 and a third frame P3 are P frames, a quantization parameter threshold of the current frame P0 may be determined according to a quantization parameter threshold of the fourth frame P4.

According to this embodiment of this application, if the current frame is a first P frame in the video stream, because a quantization parameter threshold corresponding to a frame in front of the current frame is determined according to the preset initial quantization parameter, when the current frame is the first P frame in the video stream, a quantization parameter threshold of the current frame that is determined by using a method for determining the quantization parameter threshold of the current frame according to the quantization parameter threshold corresponding to the frame in front of the current frame is the same as a quantization parameter threshold of the current frame that is determined by using a method for determining the quantization parameter threshold of the current frame according to the preset initial quantization parameter.

Step 302: Determine that a quantization parameter estimated value of the current frame is a fixed quantization parameter value corresponding to the current frame.

In this embodiment of this application, an encoding mode of an encoder is encoding with a fixed quantization parameter.

Step 303: Determine whether the quantization parameter estimated value is greater than the quantization parameter threshold, and if yes, perform step 304; otherwise, perform step 306.

Step 304: Determine that the current frame is downsampling encoded.

Step 305: Determine a quantization parameter actual value of the current frame according to a difference between the quantization parameter estimated value and a preset quantization parameter offset value.

Step 306: Determine that the current frame is full-resolution encoded.

For a specific implementation process and a principle of step 302 to step 306, refer to the detailed descriptions in the foregoing embodiment, and details are not described herein again.

According to the encoding resolution control method provided in this embodiment of this application, a quantization parameter threshold of a current frame is first determined according to a preset initial quantization parameter; then it is determined that a quantization parameter estimated value of the current frame is a fixed quantization parameter value corresponding to the current frame; and if the quantization parameter estimated value is greater than quantization parameter threshold, it is determined that the current frame is downsampling encoded, and a quantization parameter actual value of the current frame is determined according to a difference between the quantization parameter estimated value and a preset quantization parameter offset value; or if the quantization parameter estimated value is less than or equal to the quantization parameter threshold, it is determined that the current frame is full-resolution encoded. Therefore, different quantization parameter thresholds are respectively set for all frames in a video stream; encoding resolution of the frame is determined according to the quantization parameter threshold and a quantization parameter estimated value; and when a current frame is a first frame or an inter-frame prediction frame in the video stream, a quantization parameter threshold of the current frame is determined according to a preset initial quantization parameter, to adaptively select encoding resolution for each frame in the video stream, so that an encoding manner of each frame is more accurate, thereby improving quality of a video picture, optimizing a visual effect of the video picture, better meeting a user requirement, and improving user experience.

It can be learned from the foregoing analysis that, the quantization parameter threshold of the current frame may be determined according to the preset rule, and the quantization parameter estimated value of the current frame is determined according to the encoding mode of the encoder, to determine the encoding resolution of the current frame according to the quantization parameter threshold and the quantization parameter estimated value of the current frame. In a possible implementation form, when the encoding mode of the encoder is encoding at a fixed bit rate, a downsampling encoded frame may be included in L encoded frames in front of the current frame. The foregoing case is described in detail below with reference to FIG. 4.

Figure 4:
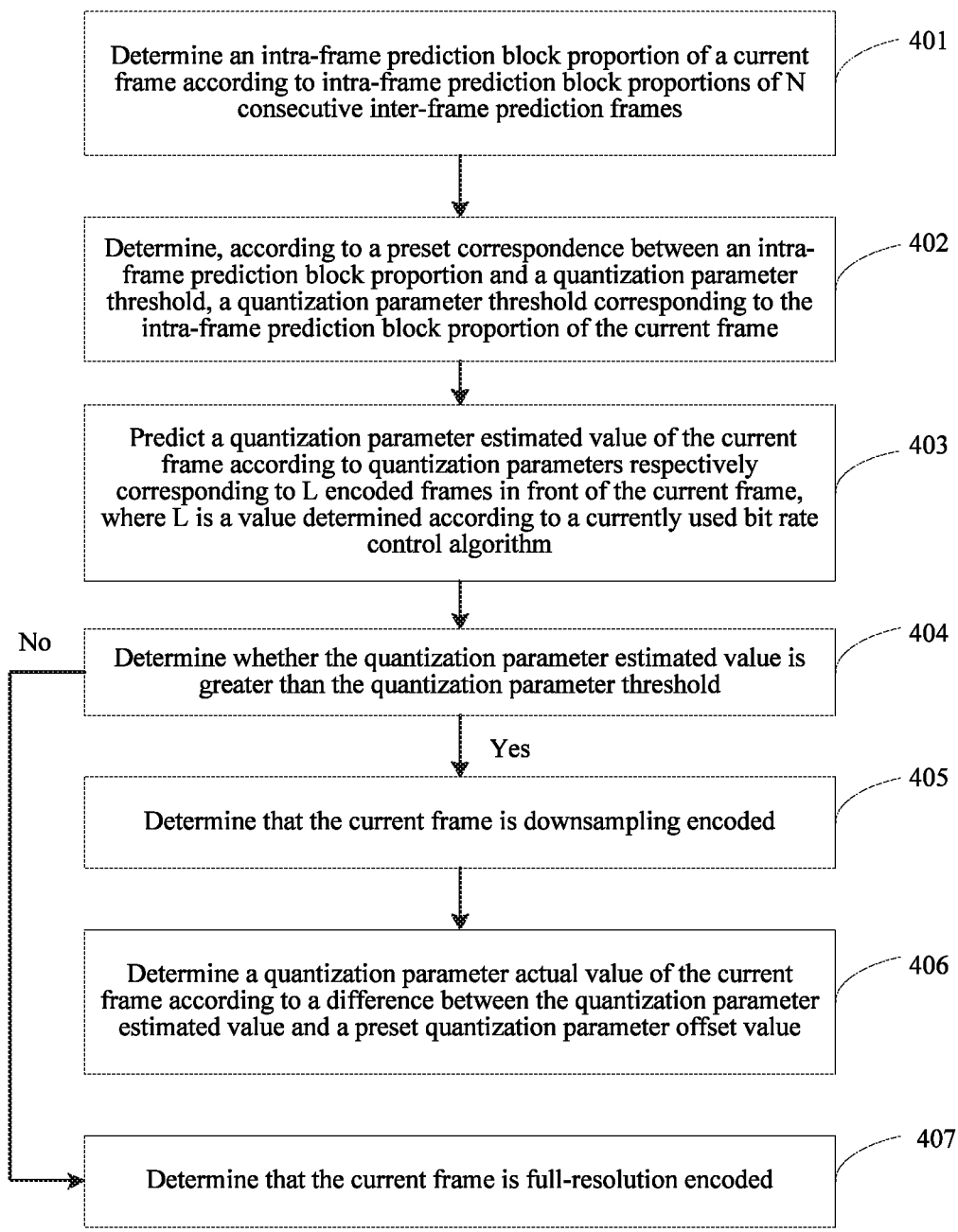
FIG. 4 is a schematic flowchart of an encoding resolution control method shown according to an embodiment of this application.

As shown in FIG. 4, the encoding resolution control method may include the following steps:

Step 401: Determine an intra-frame prediction block proportion of a current frame according to intra-frame prediction block proportions of N consecutive inter-frame prediction frames.

A value of N may be a predetermined fixed value or may be a value determined as required. This is not limited herein.

Step 402: Determine, according to a preset correspondence between an intra-frame prediction block proportion and a quantization parameter threshold, a quantization parameter threshold corresponding to the intra-frame prediction block proportion of the current frame.

Step 403: Predict a quantization parameter estimated value of the current frame according to quantization parameters respectively corresponding to L encoded frames in front of the current frame, where L is a value determined according to a currently used bit rate control algorithm.

In this embodiment of this application, an encoding mode of an encoder is encoding at a fixed bit rate.

When the quantization parameter estimated value of the current frame is predicted according to the quantization parameters respectively corresponding to the L encoded frames in front of the current frame, the L encoded frames may all be full-resolution encoded frames or may include a downsampling encoded frame.

If the L encoded frames are all full-resolution encoded frames, because it is assumed that the current frame is full-resolution encoded, prediction is directly performed according to the quantization parameters respectively corresponding to the L encoded frames, to obtain the quantization parameter estimated value of the full-resolution encoded current frame.

If the L encoded frames include a downsampling encoded frame, if the quantization parameter estimated value of the full-resolution encoded current frame is directly predicted by using the quantization parameters respectively corresponding to the L encoded frames, a prediction result may be inaccurate. Therefore, in this embodiment of this application, a quantization parameter corresponding to the downsampling encoded frame in the L encoded frames may be further processed, so that the predicted quantization parameter estimated value of the current frame is more accurate, that is step 403 may be implemented by the following step 403a and step 403b.

Step 403a: Determine, according to a preset quantization parameter offset value, a full-resolution quantization parameter corresponding to the downsampling encoded frame.

Step 403b: Predict the quantization parameter estimated value of the current frame according to full-resolution quantization parameters respectively corresponding to the L encoded frames.

According to this embodiment of this application, to cause a downsampling encoded quantization parameter to correspond to a full-resolution encoded quantization parameter, the quantization parameter offset value may be preset, to determine, according to the preset quantization parameter offset value, and a downsampling quantization parameter corresponding to the downsampling encoded frame, the full-resolution quantization parameter corresponding to the downsampling encoded frame, to predict the quantization parameter estimated value of the current frame according to the full-resolution quantization parameters respectively corresponding to the L encoded frames.

The quantization parameter offset value is used to represent a difference between a full-resolution quantization parameter and a downsampling quantization parameter, and may be set according to experience.

For example, the quantization parameter offset value $QP_{delta}$ may be preset to be equal to the full-resolution quantization parameter QP'—the downsampling quantization parameter QP, that is, 8, Assuming that two encoded frames in front of the current frame are respectively L1 and L2, quantization parameters respectively corresponding to L1 and L2 are: $QP_{L1}=20$ and $QP_{L2}=25$, and L1 and L2 are both downsampling encoded frames, it may be determined, according to the quantization parameter offset value $QP_{delta}$, that full-resolution quantization parameters $QP_{L1}'$ and $QP_{L2}'$ respectively corresponding to L1 and L2 are respectively: $QP_{L1}'=QP_{L1}+QP_{delta}=20+8=28$ and $QP_{L2}'=QP_{L2}+QP_{delta}=25+8=33$. Therefore, the quantization parameter estimated value of the current frame may be predicted according to the full-resolution quantization parameters $QP_{L1}'$ and $QP_{L2}'$ respectively corresponding to L1 and L2.

Step 404: Determine whether the quantization parameter estimated value is greater than the quantization parameter threshold, and if yes, perform step 405; otherwise, perform step 407.

Step 405: Determine that the current frame is downsampling encoded.

Step 406: Determine a quantization parameter actual value of the current frame according to a difference between the quantization parameter estimated value and a preset quantization parameter offset value.

Step 407: Determine that the current frame is full-resolution encoded.

For a specific implementation process and a principle of step 401 to step 407, refer to the detailed descriptions in the foregoing embodiment, and details are not described herein again.

According to the encoding resolution control method provided in this embodiment of this application, a quantization parameter threshold of a current frame is first determined according to a preset rule; a quantization parameter estimated value of the current frame is predicted according to quantization parameters respectively corresponding to L encoded frames in front of the current frame; and if the quantization parameter estimated value is greater than the quantization parameter threshold, it is determined that the current frame is downsampling encoded, and a quantization parameter actual value of the current frame is determined according to a difference between the quantization parameter estimated value and a preset quantization parameter offset value; or if the quantization parameter estimated value is less than or equal to the quantization parameter threshold, it is determined that the current frame is full-resolution encoded. Therefore, different quantization parameter thresholds are respectively set for all frames in a video stream, and then encoding resolution of the frame is determined according to the quantization parameter threshold and the quantization parameter estimated value, to adaptively select encoding resolution for each frame in the video stream, so that an encoding manner of each frame is more accurate, thereby improving quality of a video picture, optimizing a visual effect of the video picture, better meeting a user requirement, and improving user experience.

Figure 5:
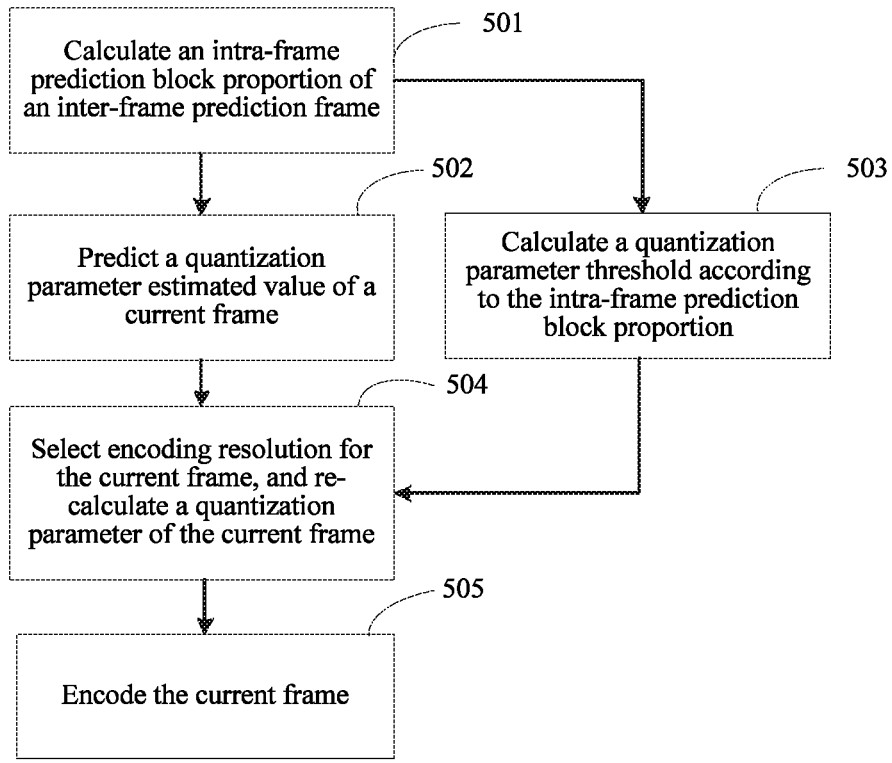
FIG. 5 is a schematic flowchart of an encoding resolution control method shown according to an embodiment of this application.

FIG. 5 shows an embodiment of an encoding resolution control method according to an embodiment of this application. As shown in FIG. 5, the encoding resolution control method includes the following steps:

501: Calculate an intra-frame prediction block proportion of an inter-frame prediction frame.

A computing device collects statistics on an intra-frame prediction block proportion of each frame, and reserves intra-frame prediction block proportions of n frames in front of a current frame, where n is equal to a smaller one in the following two values: a quantity of consecutive inter-frame prediction frames in front of the current frame and a preset value (which, for example, may be set to 2).

The intra-frame prediction block proportions of the n frames in front of the current frame are denoted as $Intra_1, \ldots,$ and $Intra_n$, and an average value $Intra_{ave}$ of the intra-frame prediction block proportions of the n frames in front is calculated to be equal to an average value of $Intra_1, \ldots,$ and $Intra_n$.

$$Intra_{ave} = \frac{\sum_{i=1}^{n} Intra_i}{n}$$

502: Predict a quantization parameter estimated value of a current frame.

In this embodiment of this application, a quantization parameter offset $QP_{delta}QP_{delta}$ may be set. To cause a downsampling encoding quantization parameter to corresponding to a full-resolution encoding quantization parameter, the quantization parameter offset needs to be set, and the full-resolution quantization parameter minus the quantization parameter offset may be used as the downsampling encoding quantization parameter.

Before the current frame is encoded, it is assumed that the current frame uses full-resolution encoding, and the quantization parameter estimated value QP' of the current frame is set.

If a current encoding mode is encoding with a fixed quantization parameter, quantization parameters of all blocks in the current frame are known, and the quantization parameter estimated value QP' of the current frame is an actual quantization parameter during full-resolution encoding of the current frame.

If the current encoding mode is encoding at a fixed bit rate, it is first assumed that the current frame is full-resolution encoded, a quantization parameter $QP_1$ of a first block in the current frame is predicted according to a quantization parameter of an encoded frame, and the quantization parameter estimated value QP' is made to be equal to the quantization parameter $QP_1$ of the first block. If the encoded frame includes a downsampling frame, the downsampling frame needs to be mapped to a corresponding full-resolution quantization parameter according to the foregoing method for setting $Qp_{delta}$, and then the quantization parameter of the first block in the current frame is predicted.

503: Calculate a quantization parameter threshold according to the intra-frame prediction block proportion.

According to this embodiment of this application, the quantization parameter threshold $QP_{TH}$ is calculated according to the average value $Intra_{ave}$ of the intra-frame prediction block proportions of the n frames in front of the current frame that is calculated in step 501. If the average value $Intra_{ave}$ of the intra-frame prediction block proportions is larger, a smaller quantization parameter threshold $QP_{TH}$ should be set, so that the current frame prefers to select the downsampling encoding; otherwise, if the average value $Intra_{ave}$ of the intra-frame prediction block proportion is smaller, a larger quantization parameter threshold $QP_{TH}$ should be set, so that the current frame prefers to select the full-resolution encoding.

A solution of setting the quantization parameter threshold $QP_{TH}$ is as follows:

$$QP_{TH} = \begin{cases} 33, & Intra_{ave} < 10\% \\ 31, & 10\% \leq Intra_{ave} < 50\% \\ 29, & Intra_{ave} \geq 50\% \end{cases}$$

504: Select encoding resolution for the current frame, and re-calculate a quantization parameter of the current frame.

The encoding resolution is selected for the current frame according to the quantization parameter threshold $QP_{TH}$ and the quantization parameter estimated value QP'.

If the quantization parameter estimated value QP' of the current frame in step 501 is greater than the quantization parameter threshold $QP_{TH}$ of the current frame, the downsampling encoding is performed on the current frame; otherwise, if the quantization parameter estimated value QP' of the current frame is less than or equal to the quantization parameter threshold $QP_{TH}$ of the current frame, the full-resolution encoding is performed on the current frame.

If the downsampling encoding is performed on the current frame, the specified quantization parameter offset $QP_{delta}$ further needs to be subtracted from the quantization parameter estimated value QP', to re-obtain a quantization parameter estimated value corresponding to the downsampling frame. If encoding is performed by using a fixed quantization parameter, the quantization parameter estimated value is a quantization parameter actual value of the current frame. If encoding is performed at a fixed bit rate, the quantization parameter estimated value may be used as a quantization parameter initial value, and the quantization parameter may also be calculated by using a bit rate control algorithm instead of using the quantization parameter estimated value.

Step 505: Encode the current frame.

After the encoding resolution of the current frame is determined, the current frame is encoded.

In this embodiment of this application, to adaptively select encoding resolution for each frame in a video stream, so that an encoding manner of each frame is more accurate, thereby improving quality of a video picture, optimizing a visual effect of the video picture, better meeting a user requirement, and improving user experience.

The following is an apparatus embodiment of this application, which can be used to perform the method embodiments of this application. For details not disclosed in the apparatus embodiment of this application, refer to the method embodiments of this application.

An encoding resolution control apparatus provided in an embodiment of this application includes:

a first determining module, configured to determine a quantization parameter threshold of a to-be-encoded current frame according to a preset rule;

a second determining module, configured to determine a quantization parameter estimated value of the current frame according to an encoding mode of an encoder; and a third determining module, configured to determine encoding resolution of the current frame according to the quantization parameter threshold and the quantization parameter estimated value of the current frame.

The encoding resolution control apparatus provided in this embodiment of this application may be configured to perform the encoding resolution control method provided in the embodiments of this application. The apparatus may be configured in any terminal, to control encoding resolution during video compression coding. There are various types of terminals, for example, the terminal may be a mobile phone or a computer.

In a possible implementation form of this embodiment of this application, the current frame is a first frame or a first inter-frame prediction frame of a video stream; and the first determining module may be configured to determine the quantization parameter threshold of the current frame according to a preset initial quantization parameter.

In another possible implementation form of this embodiment of this application, the current frame is an inter-frame prediction frame, and a frame in front of the current frame is an intra-frame prediction frame; and the first determining module is specifically configured to determine the quantization parameter threshold of the current frame according to a quantization parameter threshold corresponding to the frame in front of the current frame.

In another possible implementation form of this embodiment of this application, the first determining module is specifically configured to:

determine an intra-frame prediction block proportion of the current frame according to intra-frame prediction block proportions of N consecutive inter-frame prediction frames in front of the current frame, where N is a positive integer greater than or equal to 1; and determine the quantization parameter threshold of the current frame according to the intra-frame prediction block proportion of the current frame.

In another possible implementation form of this embodiment of this application, the first determining module is further configured to:

determine a quantity M of consecutive inter-frame prediction frames in front of the current frame, where M is a non-negative number; and determine that N=M when M is a value greater than or equal to 1 and less than or equal to 2; otherwise, determine that N=2.

In another possible implementation form of this embodiment of this application, the first determining module is further configured to: determine the intra-frame prediction block proportion of the current frame according to an average value of the intra-frame prediction block proportions of the N frames.

In another possible implementation form of this embodiment of this application, the first determining module is further configured to: determine, according to a preset correspondence between an intra-frame prediction block proportion and a quantization parameter threshold, a quantization parameter threshold corresponding to the intra-frame prediction block proportion of the current frame.

In another possible implementation form of this embodiment of this application, the second determining module may be configured to: determine, if the encoding mode of the encoder is encoding with a fixed quantization parameter, that the quantization parameter estimated value of the current frame is a fixed quantization parameter value corresponding to the current frame; or predict, if the encoding mode of the encoder is encoding at a fixed bit rate, the quantization parameter estimated value of the current frame according to quantization parameters respectively corresponding to L encoded frames in front of the current frame, where L is a value determined according to a currently used bit rate control algorithm.

In another possible implementation form of this embodiment of this application, the L frames include a downsampling encoded frame; and the second determining module is further configured to: determine, according to a preset quantization parameter offset value, a full-resolution quantization parameter corresponding to the downsampling encoded frame; and predict the quantization parameter estimated value of the current frame according to full-resolution quantization parameters respectively corresponding to the L encoded frames.

In another possible implementation form of this embodiment of this application, the third determining module may be configured to: determine, if the quantization parameter estimated value is greater than the quantization parameter threshold, that the current frame is downsampling encoded; otherwise, determine that the current frame is full-resolution encoded.

In another possible implementation form of this embodiment of this application, the third determining module may be further configured to determine a quantization parameter actual value of the current frame according to a difference between the quantization parameter estimated value and a preset quantization parameter offset value.

It should be noted that the explanations and the descriptions of the encoding resolution control method embodiment are also applicable to the encoding resolution control apparatus in this embodiment, and details are not described herein again.

The encoding resolution control apparatus provided in this embodiment of this application first determines a quantization parameter threshold of a current frame according to a preset rule; then determines a quantization parameter estimated value of the current frame according to an encoding mode of an encoder; and finally determines encoding resolution of the current frame according to the quantization parameter threshold and the quantization parameter estimated value of the current frame. Therefore, different quantization parameter thresholds are respectively set for all frames in a video stream, and then encoding resolution of the frame is determined according to the quantization parameter threshold and the quantization parameter estimated value, to adaptively select encoding resolution for each frame in the video stream, so that an encoding manner of each frame is more accurate, thereby improving quality of a video picture, optimizing a visual effect of the video picture, better meeting a user requirement, and improving user experience.

In an exemplary embodiment, a terminal is further provided.

Figure 6:
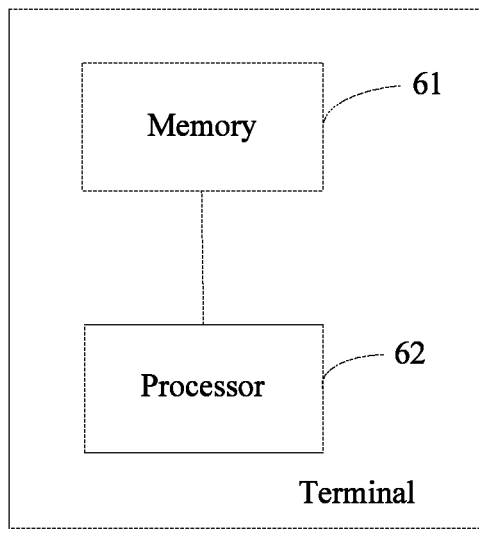
FIG. 6 is a structural block diagram of a terminal shown according to an embodiment of this application.

FIG. 6 is a structural block diagram of a terminal shown according to an exemplary embodiment.

As shown in FIG. 6, the terminal includes:

a memory 61, a processor 62, and a computer program stored in the memory 61 and capable of being run on the processor 62, when the processor 62 executing the program, the encoding resolution control method according to the first aspect being implemented.

The terminal provided in this embodiment of this application may be a mobile phone, a computer, or the like.

An encoding resolution control method includes:

determining a quantization parameter threshold of a to-be-encoded current frame according to a preset rule;

determining a quantization parameter estimated value of the current frame according to an encoding mode of an encoder; and determining encoding resolution of the current frame according to the quantization parameter threshold and the quantization parameter estimated value of the current frame.

It should be noted that the explanations and the descriptions of the encoding resolution control method embodiment are also applicable to the server in this embodiment, and details are not described herein again.

The terminal provided in this embodiment of this application first determines a quantization parameter threshold of a to-be-encoded current frame according to a preset rule; then determines a quantization parameter estimated value of the current frame according to an encoding mode of an encoder; and finally determines encoding resolution of the current frame according to the quantization parameter threshold and the quantization parameter estimated value of the current frame. Therefore, different quantization parameter thresholds are respectively set for all frames in a video stream, and then encoding resolution of the frame is determined according to the quantization parameter threshold and the quantization parameter estimated value, to adaptively select encoding resolution for each frame in the video stream, so that an encoding manner of each frame is more accurate, thereby improving quality of a video picture, optimizing a visual effect of the video picture, better meeting a user requirement, and improving user experience.

In an exemplary embodiment, a computer-readable storage medium is further provided. The computer-readable storage medium stores a computer program, when the program is executed by the processor, the encoding resolution control method described in the foregoing embodiment being implemented.

According to this embodiment of this application, this encoding resolution control method includes:

determining a quantization parameter threshold of a to-be-encoded current frame according to a preset rule;

determining a quantization parameter estimated value of the current frame according to an encoding mode of an encoder; and determining encoding resolution of the current frame according to the quantization parameter threshold and the quantization parameter estimated value of the current frame.

It should be noted that the explanations and the descriptions of the encoding resolution control method embodiment are also applicable to the computer-readable storage medium in this embodiment, and details are not described herein again.

The computer-readable storage medium provided in this embodiment of this application may be disposed in a device needing to perform video compression coding, and during the video compression coding, the encoding resolution control method stored in the computer-readable storage medium is performed, to adaptively select encoding resolution for each frame in a video stream, so that an encoding manner of each frame is more accurate, thereby improving quality of a video picture, optimizing a visual effect of the video picture, better meeting a user requirement, and improving user experience.

In an exemplary embodiment, a computer program product is further provided. When an instruction in the computer program product is executed by a processor, the encoding resolution control method described in the foregoing embodiment is performed.

According to this embodiment of this application, the encoding resolution control method includes:

determining a quantization parameter threshold of a to-be-encoded current frame according to a preset rule;

determining a quantization parameter estimated value of the current frame according to an encoding mode of an encoder; and determining encoding resolution of the current frame according to the quantization parameter threshold and the quantization parameter estimated value of the current frame.

It should be noted that the explanations and the descriptions of the encoding resolution control method embodiment are also applicable to the computer program product in this embodiment, and details are not described herein again.

The computer program product provided in this embodiment of this application may be written into a device needing to perform video compression coding, and during the video compression coding, a program corresponding to the encoding resolution control method is executed, to adaptively select encoding resolution for each frame in a video stream, so that an encoding manner of each frame is more accurate, thereby improving quality of a video picture, optimizing a visual effect of the video picture, better meeting a user requirement, and improving user experience.

In the descriptions of this application, it should be understood that, terms "first" and "second" are used for the purpose of description, and should not be understood as indicating or implying relative importance or implying a quantity of indicated technical features. Therefore, a feature defined by "first" or "second" can explicitly or implicitly include one or more of said features. In the descriptions of this application, unless otherwise specified, "a plurality of" means two or more than two.

In the descriptions of this specification, reference terms such as "an embodiment", "some embodiments", "example", "specific example", or "some examples" mean that specific features or characteristics described with reference to the embodiments or the examples are included in at least one embodiment or example of this application. In this specification, the indicative expression of the terms does not need to be specific to the same embodiments or examples. In addition, the described specific features or characteristics can be combined in an appropriate manner in any one or more embodiments or examples. In addition, in the non-contradictory context, a person skilled in the art may integrate and combine the different embodiments or examples described in this specification and the features of the different embodiments or examples Any process or method description in a flowchart or described herein can be understood as representing a module, a segment, or a part of code including one or more executable instructions for implementing steps of a particular logical function or process, and the scope of the implementations of this application includes an additional implementation, where functions may not need to be performed in a shown or discussed order, including a basic simultaneous manner or a reverse order of related functions. This shall be understood by a person skilled in the art of the embodiments of this application.

Logic and/or steps represented in a flowchart or described herein in another manner, for example, a sequencing list of executable instructions that can be considered to be used for implementing logical functions, can be specifically implemented in any computer-readable medium, for an instruction execution system, an apparatus, or a device (such as a computer-based system, a system including a processor, or other systems that can obtain instructions from the instruction execution system, the apparatus, or the device and execute the instructions), or to be used in combination with these instruction execution systems, apparatuses, or devices. For this specification, the "computer-readable medium" may be any apparatus that can include, store, communicate, propagate, or transmit programs to be used by the instruction execution system, the apparatus, or the device or to be used in combination with the instruction execution system, the apparatus, or the device. More specific examples of the computer-readable medium (non-exhaustive lists) include the following: an electrical connection part with one or more wirings (an electronic apparatus), a portable computer cartridge (a magnetic apparatus), a random access memory (RAM), a read-only memory (ROM), an erasable editable ROM (an EPROM or a flash memory), a fiber optic apparatus, and a portable compact disc ROM (CDROM). In addition, the computer-readable medium may even be paper or other suitable media on which the program can be printed, because the program can be obtained electronically, for example, by optically scanning paper or other media, then by editing, interpreting or, if necessary, processing in other appropriate manners, and then stored in a computer memory It should be understood that, parts of this application can be implemented by hardware, software, firmware, or a combination thereof. In the foregoing implementations, a plurality of steps or methods can be implemented by software or firmware stored in the memory and executed by an appropriate instruction execution system. For example, if the plurality of steps or methods is implemented by hardware, as in another embodiment, the plurality of steps or methods can be implemented by any one or a combination of the following technologies known in the art: a discrete logic circuit having a logical gate circuit for implementing a logical function for a data signal, an application-specific integrated circuit having an appropriate combinational logic gate circuit, a programmable gate array (PGA), a field programmable gate array (FPGA), and the like.

A person of ordinary skill in the art should understand that, all or some of the steps in the foregoing method embodiments may be implemented by a program instructing relevant hardware. The program may be stored in a computer-readable storage medium. When the program is executed, one or a combination of the steps in the method embodiment is performed.

In addition, functional units in the embodiments of this application may be integrated into one processing module, or each of the units may exist alone physically, or two or more units may be integrated into one module. The integrated module may be implemented in a form of hardware, or may be implemented in a form of a software functional module. If implemented in the form of software functional modules and sold or used as an independent product, the integrated modules may also be stored in a computer-readable storage medium.

The aforementioned storage medium may be a ROM, a magnetic disk, or an optical disc. Although the embodiments of this application have been shown and described above, it may be understood that the foregoing embodiments are exemplary and cannot be construed as a limitation on this application, and a person of ordinary skill in the art may change, modify, replace and vary the foregoing embodiments within the scope of this application.

What is claimed is:

1. An encoding resolution control method, applied to a computer device having one or more processors and memory storing programs to be executed by the one or more processors and the method comprising:
    calculating a quantization parameter threshold of a to-be-encoded current frame according to a preset rule, further including:
        calculating an intra-frame prediction block proportion of the current frame according to intra-frame prediction block proportions of N consecutive inter-frame prediction frames in front of the current frame, wherein N is a positive integer greater than or equal to 1, wherein the intra-frame prediction block proportion is a proportion of intra-frame prediction blocks to all blocks in an inter-frame prediction encoded frame;
        calculating the quantization parameter threshold of the current frame according to the intra-frame prediction block proportion of the current frame;
    calculating a quantization parameter estimated value of the current frame according to an encoding mode of an encoder;
    determining an encoding resolution of the current frame according to the quantization parameter threshold and the quantization parameter estimated value of the current frame, further including:
        when the quantization parameter estimated value is greater than the quantization parameter threshold, determining the encoding resolution as a downsampling encoding; and
        when the quantization parameter estimated value is less than the quantization parameter threshold, determining that the encoding resolution is a full-resolution encoding; and
    encoding the current frame into a bitstream according to the encoding resolution.

2. The method according to claim 1, wherein the current frame is a first frame or a first inter-frame prediction frame of a video stream; and
    the determining a quantization parameter threshold of a to-be-encoded current frame according to a preset rule comprises:
    determining the quantization parameter threshold of the current frame according to a preset initial quantization parameter.

3. The method according to claim 1, wherein the current frame is an inter-frame prediction frame, and a frame in front of the current frame is an intra-frame prediction frame; and
    the determining a quantization parameter threshold of a to-be-encoded current frame according to a preset rule comprises:
    determining the quantization parameter threshold of the current frame according to a quantization parameter threshold corresponding to the frame in front of the current frame.

4. The method according to claim 1, wherein before the determining an intra-frame prediction block proportion of the current frame, the method further comprises:
    determining a quantity M of consecutive inter-frame prediction frames in front of the current frame, wherein M is a non-negative number; and
    determining that N=M when M is a value greater than or equal to 1 and less than or equal to 2; otherwise, determining that N=2.

5. The method according to claim 1, wherein the determining an intra-frame prediction block proportion of the current frame comprises:
    determining the intra-frame prediction block proportion of the current frame according to an average value of the intra-frame prediction block proportions of the N frames.

6. The method according to claim 1, wherein the determining the quantization parameter threshold of the current frame according to the intra-frame prediction block proportion of the current frame comprises:
    determining, according to a preset correspondence between an intra-frame prediction block proportion and a quantization parameter threshold, a quantization parameter threshold corresponding to the intra-frame prediction block proportion of the current frame.

7. The method according to claim 1, wherein the determining a quantization parameter estimated value of the current frame according to an encoding mode of an encoder comprises:
    determining, if the encoding mode of the encoder is encoding with a fixed quantization parameter, that the quantization parameter estimated value of the current frame is a fixed quantization parameter value corresponding to the current frame; or
    predicting, if the encoding mode of the encoder is encoding at a fixed bit rate, the quantization parameter estimated value of the current frame according to quantization parameters respectively corresponding to L encoded frames in front of the current frame, wherein L is a value determined according to a currently used bit rate control algorithm.

8. The method according to claim 7, wherein the L frames comprise a downsampling encoded frame; and
    the predicting the quantization parameter estimated value of the current frame according to quantization parameters respectively corresponding to L encoded frames in front of the current frame comprises:
    determining, according to a preset quantization parameter offset value, a full-resolution quantization parameter corresponding to the downsampling encoded frame; and
    predicting the quantization parameter estimated value of the current frame according to full-resolution quantization parameters respectively corresponding to the L encoded frames.

9. The method according to claim 1, wherein after the determining that the encoding resolution of the current frame uses downsampling, the method further comprises:
    determining a quantization parameter actual value of the current frame according to a difference between the quantization parameter estimated value and a preset quantization parameter offset value.

10. A computer device comprising one or more processors, memory coupled to the one or more processors and a plurality of programs stored in the memory that, when executed by the one or more processors, cause the computer device to perform a plurality of operations comprising:

calculating a quantization parameter threshold of a to-be-encoded current frame according to a preset rule, further including:
　　calculating an intra-frame prediction block proportion of the current frame according to intra-frame prediction block proportions of N consecutive inter-frame prediction frames in front of the current frame, wherein N is a positive integer greater than or equal to 1, wherein the intra-frame prediction block proportion is a proportion of intra-frame prediction blocks to all blocks in an inter-frame prediction encoded frame;
　　calculating the quantization parameter threshold of the current frame according to the intra-frame prediction block proportion of the current frame;
calculating a quantization parameter estimated value of the current frame according to an encoding mode of an encoder;
determining an encoding resolution of the current frame according to the quantization parameter threshold and the quantization parameter estimated value of the current frame, further including:
　　when the quantization parameter estimated value is greater than the quantization parameter threshold, determining the encoding resolution as a downsampling encoding; and
　　when the quantization parameter estimated value is less than the quantization parameter threshold, determining that the encoding resolution is a full-resolution encoding;
and; and
encoding the current frame into a bitstream according to the encoding resolution.

11. The computer device according to claim 10, wherein the current frame is a first frame or a first inter-frame prediction frame of a video stream; and
　　the determining a quantization parameter threshold of a to-be-encoded current frame according to a preset rule comprises:
　　determining the quantization parameter threshold of the current frame according to a preset initial quantization parameter.

12. The computer device according to claim 10, wherein the current frame is an inter-frame prediction frame, and a frame in front of the current frame is an intra-frame prediction frame; and
　　the determining a quantization parameter threshold of a to-be-encoded current frame according to a preset rule comprises:
　　determining the quantization parameter threshold of the current frame according to a quantization parameter threshold corresponding to the frame in front of the current frame.

13. The computer device according to claim 10, wherein the determining a quantization parameter estimated value of the current frame according to an encoding mode of an encoder comprises:
　　determining, if the encoding mode of the encoder is encoding with a fixed quantization parameter, that the quantization parameter estimated value of the current frame is a fixed quantization parameter value corresponding to the current frame; or
　　predicting, if the encoding mode of the encoder is encoding at a fixed bit rate, the quantization parameter estimated value of the current frame according to quantization parameters respectively corresponding to L encoded frames in front of the current frame, wherein L is a value determined according to a currently used bit rate control algorithm.

14. The computer device according to claim 13, wherein the L frames comprise a downsampling encoded frame; and
　　the predicting the quantization parameter estimated value of the current frame according to quantization parameters respectively corresponding to L encoded frames in front of the current frame comprises:
　　determining, according to a preset quantization parameter offset value, a full-resolution quantization parameter corresponding to the downsampling encoded frame; and
　　predicting the quantization parameter estimated value of the current frame according to full-resolution quantization parameters respectively corresponding to the L encoded frames.

15. A non-transitory computer readable storage medium storing a plurality of machine readable instructions in connection with a computer device having one or more processors, wherein the plurality of machine readable instructions, when executed by the one or more processors, cause the computer device to perform a plurality of operations including:
　　calculating a quantization parameter threshold of a to-be-encoded current frame according to a preset rule, further including:
　　　　calculating an intra-frame prediction block proportion of the current frame according to intra-frame prediction block proportions of N consecutive inter-frame prediction frames in front of the current frame, wherein N is a positive integer greater than or equal to 1, wherein the intra-frame prediction block proportion is a proportion of intra-frame prediction blocks to all blocks in an inter-frame prediction encoded frame;
　　　　calculating the quantization parameter threshold of the current frame according to the intra-frame prediction block proportion of the current frame;
　　calculating a quantization parameter estimated value of the current frame according to an encoding mode of an encoder;
　　determining an encoding resolution of the current frame according to the quantization parameter threshold and the quantization parameter estimated value of the current frame, further including:
　　　　when the quantization parameter estimated value is greater than the quantization parameter threshold, determining the encoding resolution as a downsampling encoding; and
　　　　when the quantization parameter estimated value is less than the quantization parameter threshold, determining that the encoding resolution is a full-resolution encoding; and
　　encoding the current frame into a bitstream according to the encoding resolution.

16. The non-transitory computer readable storage medium according to claim 15, wherein the current frame is a first frame or a first inter-frame prediction frame of a video stream; and
　　the determining a quantization parameter threshold of a to-be-encoded current frame according to a preset rule comprises:
　　determining the quantization parameter threshold of the current frame according to a preset initial quantization parameter.

* * * * *